United States Patent [19]
Roberts

[11] Patent Number: 5,653,523
[45] Date of Patent: Aug. 5, 1997

[54] MINIATURE CENTRIFUGAL LIGHTING ASSEMBLY

[76] Inventor: Thomas J. Roberts, 884 Maple St., Spring Lake Park, Minn. 55432

[21] Appl. No.: 91,625

[22] Filed: Jul. 15, 1993

[51] Int. Cl.$^6$ .................................... A63C 17/26
[52] U.S. Cl. .............. 362/78; 362/158; 362/800; 362/802
[58] Field of Search ................. 362/78, 103, 157, 362/158, 190, 191, 800, 802; 200/61.45, 61.46, 61.48, 61.49; 280/11.22, 11.27, 11.28; 301/5.7; 446/47

[56] References Cited

U.S. PATENT DOCUMENTS

| | | | |
|---|---|---|---|
| 2,811,633 | 10/1957 | Bjork | 240/7.55 |
| 2,931,012 | 3/1960 | Kosach | 340/81 |
| 3,502,831 | 3/1970 | McRoskey | 200/61.49 |
| 3,714,412 | 1/1973 | Franklin | 240/7.55 |
| 3,786,246 | 1/1974 | Johnson et al. | 240/6.4 |
| 3,789,208 | 1/1974 | Lewis | 240/6.4 |
| 3,812,614 | 5/1974 | Harrington | 46/228 |
| 3,924,114 | 12/1975 | Sanchez | 240/6.4 |
| 4,135,229 | 1/1979 | Modurkay | 362/72 |
| 4,298,910 | 11/1981 | Price | 362/103 |
| 4,327,518 | 5/1982 | Knauff | 46/228 |
| 4,336,573 | 6/1982 | Carter | 362/78 |
| 4,363,502 | 12/1982 | Bakerman | 362/103 |
| 4,383,244 | 5/1983 | Knauff | 340/321 |
| 4,535,392 | 8/1985 | Montgomery | 362/800 |
| 4,648,610 | 3/1987 | Hegyi | 362/192 |
| 4,787,014 | 11/1988 | Wodder et al. | 362/78 |
| 4,796,972 | 1/1989 | Thomas et al. | 350/99 |
| 4,800,469 | 1/1989 | Leon | 362/72 |
| 4,847,735 | 7/1989 | Kawasaki | 362/72 |
| 4,867,727 | 9/1989 | Lanius | 446/242 |
| 4,893,877 | 1/1990 | Powell et al. | 301/108 |
| 4,929,212 | 5/1990 | Li | 446/47 |
| 5,015,918 | 5/1991 | Copeland | 315/76 |
| 5,029,055 | 7/1991 | Lindh | 362/199 |
| 5,048,848 | 9/1991 | Olson et al. | 301/5.7 |
| 5,121,305 | 6/1992 | Deed et al. | 362/72 |
| 5,145,444 | 9/1992 | VanKuiken | 446/242 |
| 5,175,528 | 12/1992 | Choi et al. | 340/331 |
| 5,278,732 | 1/1994 | Frankum | 362/72 |
| 5,278,733 | 1/1994 | St. Thomas | 362/78 |
| 5,283,547 | 2/1994 | Leon | 362/78 |
| 5,294,188 | 3/1994 | Vancil, Jr. | 362/78 |
| 5,475,572 | 12/1995 | Tseng | 362/78 |

*Primary Examiner*—James C. Yeung
*Assistant Examiner*—Sara Sachie Raab
*Attorney, Agent, or Firm*—Moore & Hansen

[57] ABSTRACT

A miniaturized lighting apparatus for a rotating object includes a light-emitting diode (LED), a centrifugal switch, a tiny 3 volt power source, and electrical conduits. The switch is configured to provide power to the LED only upon application of a specific centrifugal force. As applied to an in-line roller skate wheel, the switch and LED may be sealed within the wheel, and the batteries never need replacement because the battery life exceeds the expected wheel life. An in-line skate wheel incorporating the lighting apparatus within it is activated to light the wheel at a predetermined centrifugal force equivalent to a given rotational speed of the wheel, such as 80 rpm. As applied to a reflector light for a bicycle wheel, the light draws power from the battery(ies) only while the wheel is turning at a minimum predetermined rotational speed such as 20 rpm. As applied to a rotatable flying disc, lighting apparatus are mounted on opposite sides of the disc, near the disc periphery. The switch is constructed to actuate the LED at a low rotational speed, and the disc itself is constructed of a phosphorescent material with persistent afterglow. Alternatively, a time delay may be incorporated into the lighting circuit to provide a delayed shut-off of current to the LED.

24 Claims, 9 Drawing Sheets

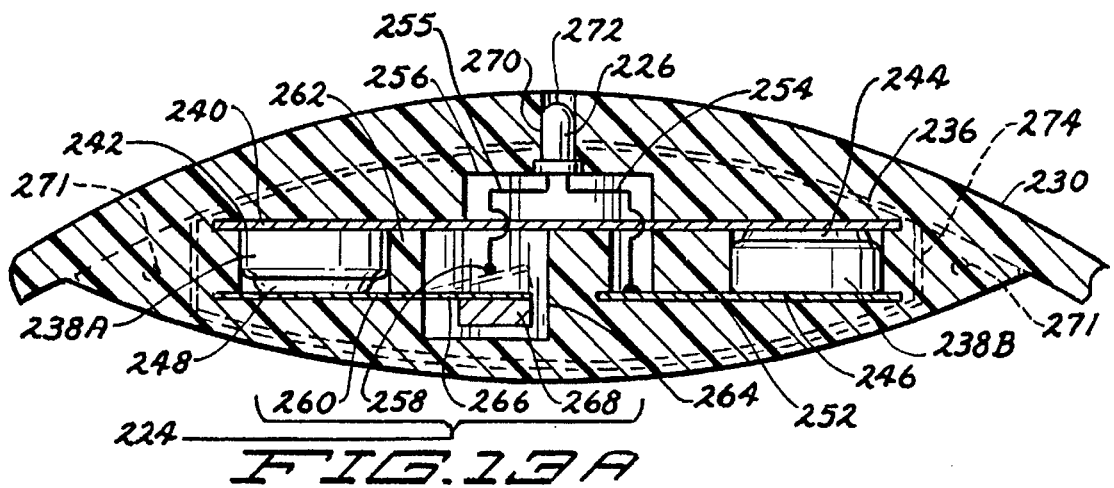
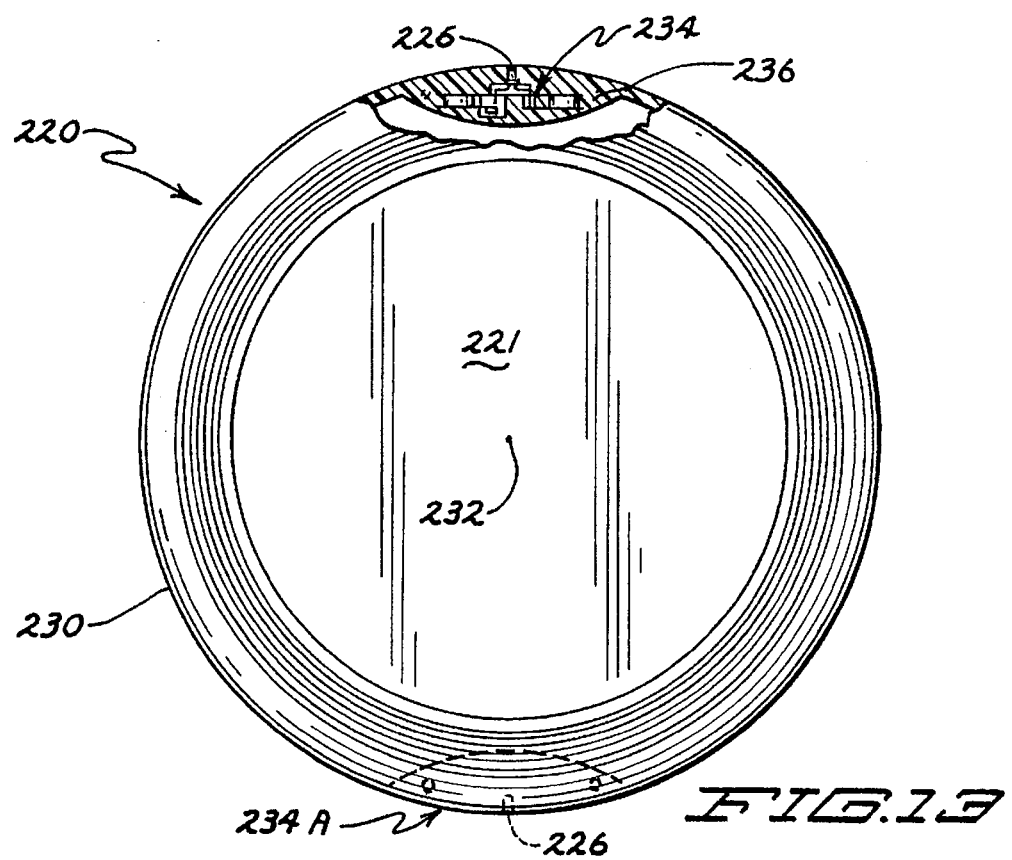
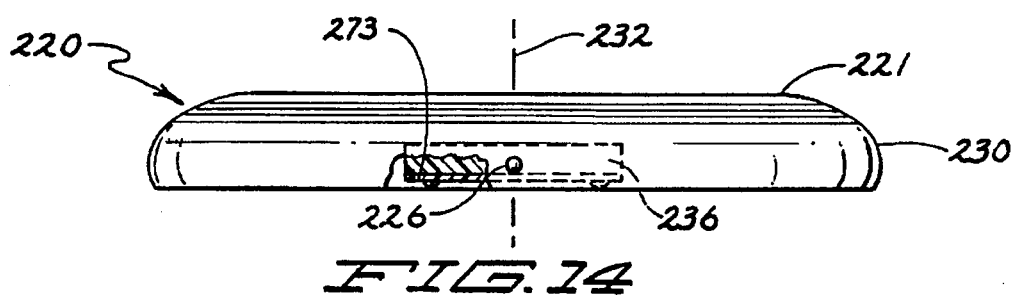

MINIATURE CENTRIFUGAL LIGHTING ASSEMBLY

BACKGROUND OF THE INVENTION

This invention relates generally to devices with wheels or other rotating parts, including in-line skates, bicycles and rotating toys and sports equipment. More particularly, this invention pertains to lighting assemblies associated with the rotating parts and which increase safety and provide visual aesthetic effects.

The use of in-line roller skates has recently become popular as a means of outdoor recreation and sport. The use of sidewalks and streets by such skaters during twilight and evening hours has brought with it a potential danger of collision with other traffic to whom the skaters are at best semivisible. It can be extremely difficult for motorists, pedestrians and other skaters to quickly locate moving skaters in the darkness.

In-line skates are largely ridden on sweets and sidewalks. The wheels are subjected to very rough treatment because of hitting holes, joints and other irregularities in the skating surfaces. Furthermore, skaters jump over objects, subjecting the wheels to high impact forces. In addition, it is common for skaters to turn sharp corners by riding at an angle on the sidewalls of the wheels. Thus, both the periphery and the sides of the wheels are subjected to severe stresses which limit wheel life.

Currently available lights for skating in darkness include battery powered blinking red light modules designed to be attached to the clothing of the skater. Such devices can generally be seen from only one direction. In addition, such lights may not be always available for night skating because of forgetfulness, dead batteries, and other reasons.

An in-line skate lighting system is needed which lights automatically when the skate is used, not requiring activation of a manual switch or repetitive battery replacement. The problem of dead or depleted batteries needs to be solved.

Similarly, bicycles require lighting systems to increase their visibility in darkness. While reflectors are commonly attached to bicycle wheels for reflecting light from automobile headlamps, reflectors do not provide needed visibility unless a light source is directed at them.

Immovably mounted bicycle lights powered by a wheel driven generator are well known.

U.S. Pat. No. 4,383,244 of Knauff discloses a lighting system for the wheels of a conventional roller skate. The system utilizes a flasher circuit and conventional ON-OFF switch to provide power from a battery to several light emitting diodes. The entire circuit is enclosed within an annular housing which is cemented to the outside of the skate wheel in cantilever fashion. This arrangement ignores both the normal wear of the wheel and the frequent riding on the wheel edge. Both of these factors will result in destructive frictional wear to the housing. The enhanced physical abuse typically placed on in-line skates precludes the application of such a lighting system to in-line skates. Furthermore, unlike the conventional roller skate wheel of Knauff, the axle of an in-line skate wheel is attached to the skate frame on both sides of the wheel, not providing enough room for inclusion of the Knauff device. In addition, the lighting device of Knauff requires manually turning on a switch on each of the eight wheels before skating, and turning off each switch when skating is halted. Otherwise, the lights will remain on when not skating, depleting the batteries. Failure to remember to turn off the switches will virtually assure the premature depletion of the batteries and need for expensive replacement and multiple housing disassembly.

BRIEF SUMMARY OF THE INVENTION

An object of the invention is to provide a miniaturized self-contained light emitting device for a rotatable apparatus.

An additional object of the invention is to provide a miniaturized serf-contained light emitting device for a rotatable apparatus wherein the light is automatically activated upon rotation of the rotatable apparatus.

A further object of the invention is to provide a light for a rotatable apparatus which avoids the need for an external electrical source with rotatable contact brushes.

Another object of the invention is to provide such a light emitting device which may be fitted into an in-line skate wheel of 50–80 mm diameter without adversely affecting the performances of the wheel.

Another object of the invention is to provide a light for a rotatable skate wheel which produces attractive visual effects.

An additional object of the invention is to provide a lighted skate wheel for enhancing the safety of the skater.

Another object of the invention is to provide a skate wheel which radiates a glow in all directions.

An additional object of the invention is to provide a lighted skate wheel with a sealed-in light module having an operable life exceeding the operable life of the wheel itself.

A further object of the invention is to provide a lighted skate wheel wherein the light may be provided in a variety of colors.

An additional object of the invention is to provide a self-contained lighting apparatus which completely fits within the envelope of an in-line skate wheel.

Another object of the invention is to incorporate a light emitting device in a skate wheel without unduly disturbing the balance of the wheel.

A further object of the invention is to incorporate a light emitting device in a skate wheel whereby the light emitting device is positively shut off when the wheel is not rotating.

A further object of the invention is to incorporate a light emitting device in a skate wheel whereby the apparatus is effectively sealed against the entry of moisture and dirt.

In another embodiment of the invention, an object of the invention is to provide a light for a bicycle wheel which automatically shuts off when the bicycle is not being ridden.

A further object of the invention is to provide a light for a bicycle which acts both as an incident light reflector and a generated light radiator.

In yet another embodiment of the invention, an object is to provide a rotating "flying disc" which illuminates for sport use in darkness.

The invention includes a miniaturized centrifugal switch actuated by a predetermined minimum magnitude of centrifugal force. The switch includes a reed rigidly mounted at one end and positioned so that the opposite end is radially deflected to make contact with a contact member, completing an electrical circuit through a light emitting diode (LED). The switch may be enclosed off-center within a rotating apparatus such as an in-line skating wheel, a bicycle wheel reflector light, or a recreational flying disc for instance.

The switch is wired between an electrical cell and a light emitting diode such as is capable of efficient conversion of electrical energy to visible radiation in a selected narrow band of the light spectrum. Light emitting diodes can be obtained which emit light in red, green, blue, and other spectral colors, and consume very little current. The current consumption may be only several times the normal current leakage from the battery.

A particular feature of the present invention is the centrifugal switch which significantly extends the life of the battery by ensuring that the light is turned "on" only when the skate or bicycle is being operated.

These and other objects and advantages of the invention will be readily understood by a reading of the following description in conjunction with the accompanying figures of the drawings wherein like reference numerals have been applied to designate like elements throughout the different views.

BRIEF DESCRIPTION OF THE DRAWINGS

FIG. 13 is a top perspective view of a lightable rotatable flying disc of the invention;

FIG. 13A is an enlarged, partially cut away view of the lighting apparatus of the invention;

FIG. 14 is a partially cut away side view of a lightable rotatable flying disc of the invention;

DESCRIPTION OF THE ILLUSTRATED EMBODIMENTS

Figure 1:
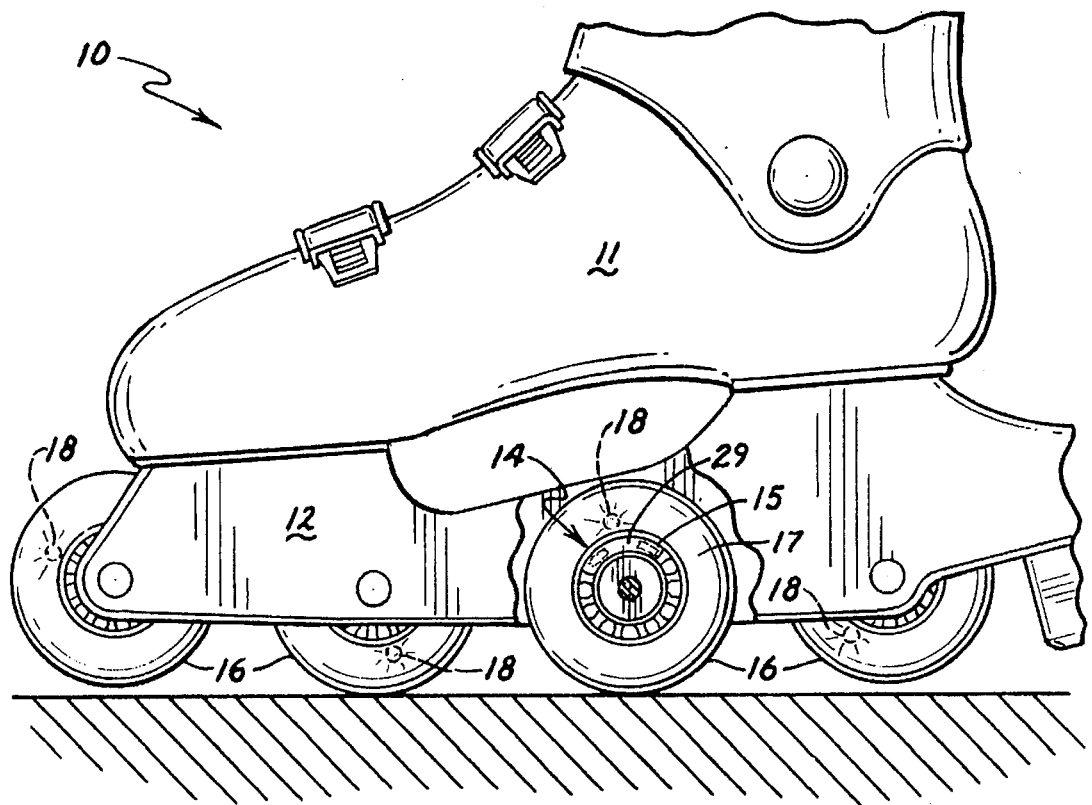
FIG. 1 is a partial side perspective view of an in-line roller skate embodying the light system of the invention.

With reference to the drawings, and particularly to FIG. 1, an exemplary in-line roller skate 10 is shown with boot 11 and skate frame 12. Mounted in the frame 12 are a plurality of identical skating wheels 16, each with a miniaturized lighting apparatus 14 within a hub 15 and tire member 17. As shown, batteries underlie a cover 29 which seals them from the entrance of water and/or dirt. This cover 29 may be of the removable snap-in type or be permanently attached. The lighting apparatus 14 includes a light emitting diode 18 which is powered and controlled by apparatus shown more clearly in FIGS. 2–5.

Figure 2:
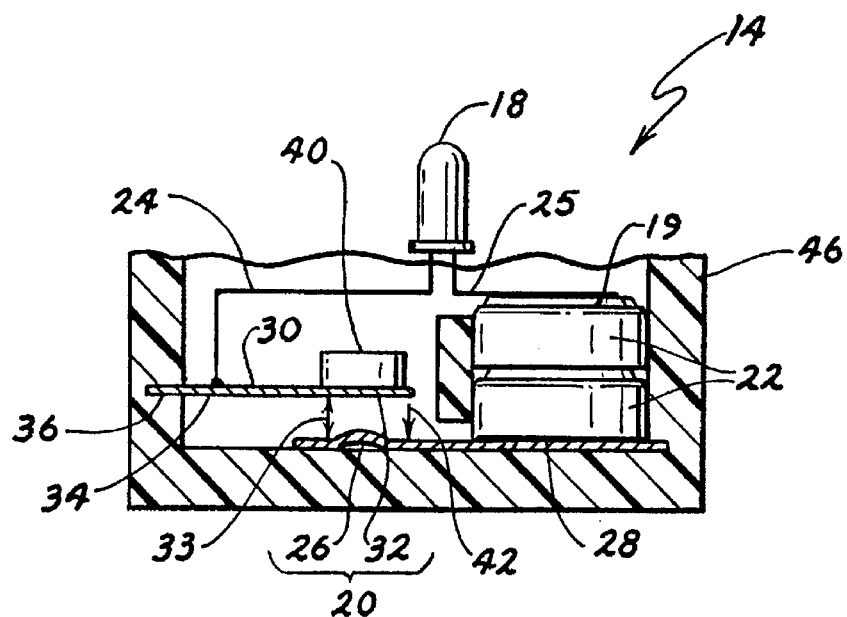
FIG. 2 is a generalized side view of a centrifugal switch of the invention.

As depicted in the simplified drawing of FIG. 2, the lighting apparatus 14 comprises light emitting diode or LED 18, a centrifugal switch 20, a power source 22 e.g. batteries and electrical conductors 24 and 25 connecting the LED, switch and power source in a circuit.

Common to each particular application of the lighting apparatus is a centrifugal switch 20 such as illustrated in FIG. 2. The switch 20 includes a first electrical contact member 26 with a first conductive connection 28. A deflectable reed 30 of spring material, e.g. spring metal has a portion comprising a second electrical contact member 32, normally spaced a predetermined distance 33 from the first electrical contact member 26 when in an off position. The reed 30 has a portion 36, generally one end, fixed in a generally rigid wall member 46. The fixed portion 36 is restrained from moving, biasing the second electrical contact member to the "non-contact" position shown in FIG. 2. The second electrical contact member 32 also has a second conductive connection 34 where it joins conductor 24. As shown, the positive terminal 19 of a battery is electrically connected by conductor 25 to the LED 18.

The first and second conductive connections 28, 34 cooperate with the electrical conductor 24 to carry the electrical current to/from the centrifugal switch 20 to activate the light emitting diode 18.

A mass 40 of dense material such as a piece of steel is fixed to the member 32 and positioned to move the second electrical contact member 32 of the reed 30 to an electrically conductive contacting position with the first electrical contact member 26 when a predetermined angular velocity of the wheel is reached. As the skate wheel, bicycle wheel or other apparatus is rotated at such predetermined speed, the mass 40 and second electrical contact member 32 move radially in response to centrifugal force toward the first electrical contact member 26, i.e. in direction 42 along the force vector, forcing the electrical contact members 26, 32 to engage in conductive contact. The elastic properties and dimensions of the reed 30, the weight of the mass 40, and the spacing between the contact members 26, 32 are selected to result in switch contact when a desired minimum rotational wheel speed is developed. The actuating rotation may be in either direction.

The mass 40 may at times be the reed 30 itself, or may comprise a weight placed on the reed 30 or attached thereto.

Figure 2A:
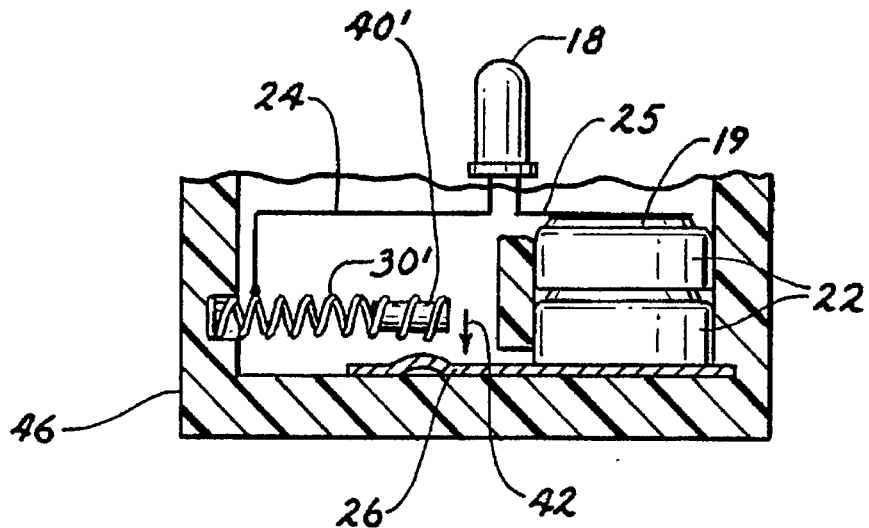
FIG. 2A is a generalized side view of another embodiment of the centrifugal switch of the invention.

In FIG. 2A, a second embodiment of a centrifugal switch utilizes a reed 30' which is a coil spring mounted in the housing wall member 46 to be deflected in a generally radial direction 42 to make electrical contact with the first electrical contact member 26. A mass 40' is shown enclosed within the spring reed 30', but may alternatively be exterior to the spring.

Figure 3:
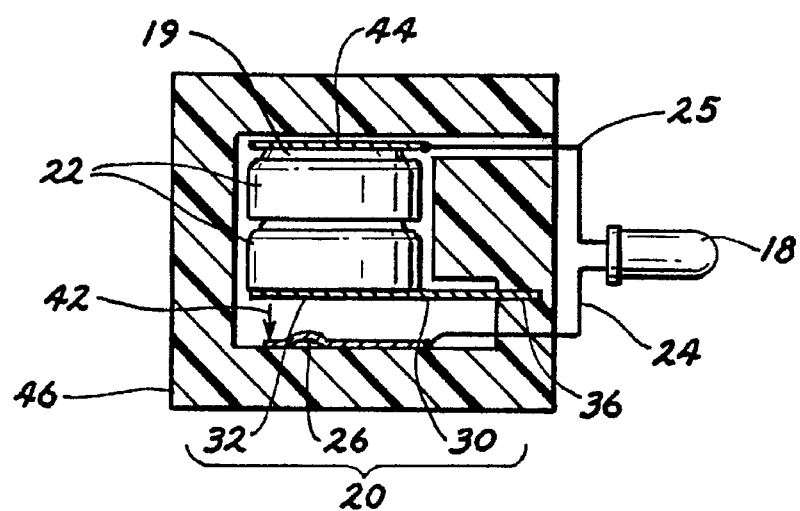
FIG. 3 is a generalized side view of another embodiment of the centrifugal switch of the invention.

In a third embodiment of a centrifugal switch shown in FIG. 3, radial deflection of the reed 30" about its fixed portion or end 36 is shown as being motivated by centrifugal force acting on the mass of one or more batteries 22. Movement of the battery(ies) deflects the reed 30' in radial direction 42, along the centrifugal force vector, to achieve contact between first and second contact members 26, 32", completing the electrical circuit. The switch 20, batteries 22, conductive member 44 and conductors 24 and 25 are shown as largely confined by housing wall member 46. Conductive member 44 is shown as also acting under centrifugal force to maintain contact with the battery.

In some embodiments, any or all of the switch, the batteries, and/or the LED may be sealed or encapsulated within the rotating device. Where the lighting apparatus is to be molded into a rotatable device, it may not always be practical to seal the batteries therein because of elevated molding temperatures. Molding processes using lower temperatures are available; however, the cost of low temperature molding is currently greater. In any case, the LED 18 and switch 20 may be completely sealed within the device if desired.

In an alternative embodiment, the mass 40 may be a separate member which impinges upon and moves the reed 30 or second contact member 32 thereof to a contact position with the first electrical contact member 26. For example, the mass 40 may comprise a piece of metal unattached to the reed 30.

The reed 30 may be constructed of various elastic materials which are not permanently deflected by the stress of the applied centrifugal force. Thus, the distance between the first and second contact members and the reed dimensions are chosen so that the elastic limit is not exceeded. The preferred reed 30 is formed of a thin planar elongate piece of conductive spring steel but plastic or other materials may be used. The portion free to bend may be from less than one cm. long to two or more cm. in length, and is lightweight. It is desirable to have the switch close at a relatively slow rotative speed, at which a low centrifugal force is generated. Hence, a mass 40 of weighted material is usually required to achieve the necessary deflection with a short reed 30. As already indicated, the mass 40 may be attached to the reed or may be a separate item which abuts the reed. For applications of the switch illustrated herein, the switch is configured to close the circuit at a predetermined centrifugal force between about $0.01 \times 10^{-3}$ and $2 \times 10^{-3}$ dynes.

The construction of the centrifugal switch as described above results in an extremely rugged switch. Thus, it may be used in applications having high applied forces in different directions and where high rotational acceleration and deceleration may be common. Such are typical of the abuse absorbed by the wheels of in-line roller skates.

Because of its small size and simplicity, the centrifugal switch is adaptable to a wide variety of size restrictive applications. For example, in a typical skate wheel lighting system where two small wafer-shaped "hearing aid" batteries of the Eveready type 303 or equivalent are used, the non-battery portion of the system may comprise less than 30% of the total weight of the lighting system. The battery power source, comprising the major portion of the weight, may be positioned close to, or even at, the axis of rotation. Because of its extremely light weight, the centrifugal force sensitive switch itself may be positioned at a greater distance off-center from the axis. As a result, very little unbalancing of the wheel occurs during rotation.

For purposes of skate racing, it may be desirable to maintain an even greater degree of balance in the wheel. In such instances, the wheel may be further balanced by providing a counterbalancing weight within the wheel at a position 180 degrees from the lighting system. At the present time, them is no need to replace the batteries 22 in a skate wheel because the battery life (about 150+ hours) significantly exceeds the typical wheel life (about 50 hours). However, when longer-lasting wheels are developed, spare batteries may be added to such a wheel and positioned as a means of counterbalancing the lighting system.

The light emitting diodes useful in this invention consume very little energy. For example, LED's useful in this lighting apparatus typically consume about 2 to 100 milliamps of direct current at 3 volts. The light emitting diodes more particularly useful are those which draw between about 5 and 50 ma of DC current at 3 volts.

In this invention, the power source generally comprises one or more small batteries such as are commonly used in hearing aids, watches and small calculators. Two 1.5 volt batteries are typically used in series. The preferred batteries are disc or wafer shaped with a diameter of about 9–14 mm and an axial height of about 3–6 min. Their weight ranges from about 2 g, to about 4 g per battery. The intention of this invention is to typically use a power source of about 3 volts, therefore, two 1.5 volt cells are to be used in series. Although the system may be designed for higher voltages, e.g. 6–9 volts, the added size, weight and/or cost of such batteries generally outweighs any advantage in increased light output. Somewhat higher voltages may be required to obtain sufficient light output from LED's generating light in certain colors.

It should be noted that the terms "battery" and "cell" are used interchangeably in this description although a more strict definition of a "battery" is a plurality of cells.

The 1.5 volt batteries typically envisioned for use in certain embodiments of the lighting system include conventional zinc-carbon batteries and alkaline batteries, the latter reputed to provide a greater current capacity than the zinc-carbon batteries. Batteries carrying the Eveready designations 303E, 357E, 386E, 389E, 391E, 395E and 675E are typical of batteries useful in this invention, being of a small size and weight and having a relatively large electrical capacity. Where space or weight of the lighting apparatus is less restrictive, the somewhat larger 1.5 volt AA or AAA batteries may be used. Alternatively, 3.0 volt batteries such as Duracell DL1/3N and the like may be used.

Where space and weight considerations outweigh the need for a long battery life, a miniature battery such as designated by Eveready 13E, 312E, 377E, 379E, 392E, 396E, 397E, 329E, 362E, 364E or 371E may be used. Such batteries are smaller than those listed earlier, and have a useful life generally less than about 60% of the comparable battery of the "hearing aid" size.

Figure 4:
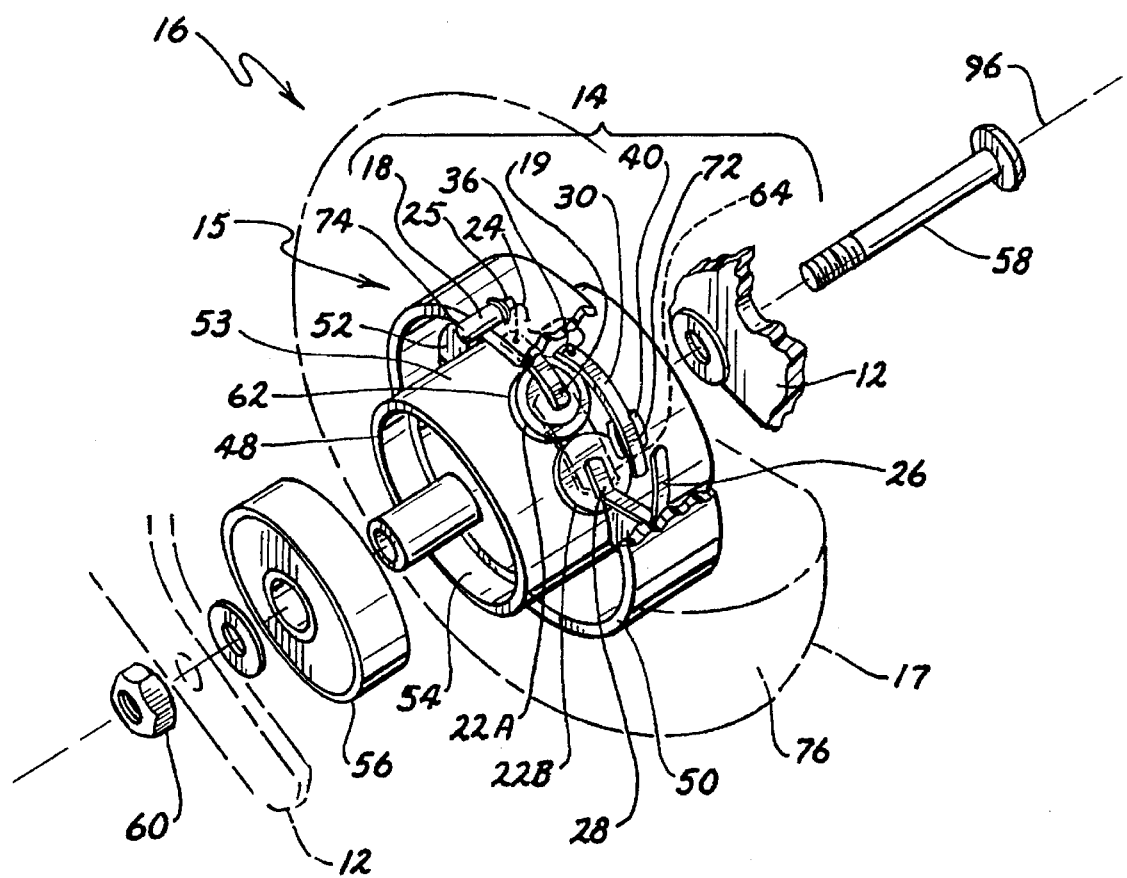
FIG. 4 is a partially cut-away perspective view of a lighted in-line roller skate wheel of the invention.

Turning now to FIG. 4, a typical in-line roller skate wheel 16 having a small one-piece hub 15 is shown with a lighting apparatus 14 of the invention. The hub 15 has an inner ring 48 of about 36 mm diameter and an outer annular ring 50 connected by spokes 52. The overall diameter of the wheel 16 is typically about 60–80 mm. but may be smaller. The hub 15 is molded of rigid plastic, and the tire portion 17 is molded of an elastomeric material such as urethane which extends radially inward to the outer surface 53 of the inner ring 48. The outer annular ring 50 is thus encased in the tire portion 17, locking the tire to the hub. The hub 15 is formed with a bearing aperture 54 on each end, for holding a bearing 56. The wheel 16 is rotatably attached to the frame 12 by a threaded axle 58 and nut 60 to rotate about axis 96.

In this embodiment of the lighting apparatus 14, two hearing aid batteries 22A and 22B are mounted in battery sockets 62 between the inner ring 48 and outer ring 50, and connected in series by conductor 64. The positive terminal 19 of battery 22A is connected by a conducting wire 25 to the LED 18. Another conducting wire 24 connects the other terminal of the LED 18 to the elongate reed 30, which has one end 36 fixed in the hub. The free end 72 of the reed is free to be deflected radially outward to contact the first contact member 26 which is connected by conductive connection 28 to the negative pole of battery 22B. It should be understood that the batteries may be reversed in polarity if desired. The outer ring 50 and spokes 52 of the hub 15 are designed to receive the switch and batteries therebetween and retain the LED outside of the inner ring 48. The LED is preferably positioned as far as possible from axis 96 to create a light locus having a large diameter. It must not be near the riding surface of the tire, where it may be subjected to high bending moments. If the LED 18 is too close to the inner ring 48, it has a small locus of light which is partially hidden by skate frame 12.

The elastomeric or plastic tire portion 17 is molded onto the hub 15 to surround the outer ring of the hub and lighting apparatus contained in the hub 15. Preferably the LED is positioned outside of the outer ring 50, recessed within the side of the tire.

Because of the temperatures typical of the plastic molding process, it is generally preferable to place the batteries in the hub after the tire member is molded about the hub. However, the batteries 22 may be integrally molded into the wheel 16 using a low temperature molding process known in the art. The other parts of the circuit, including the switch 20, LED 18 and conducting members 28, 64, 25, and 24 may be encapsulated within the wheel when the tire portion is molded about the hub 15 or be subsequently fitted into the hub. Thus, the complete lighting apparatus may be sealingly encapsulated into the wheel, preventing water or dirt from interfering with its operation.

The LED 18 may be mounted in the tire portion 17 with its light emitting end 74 open to the atmosphere on one side of the wheel 16. However, the LED 18 is preferably completely encased within the tire portion, having its light emitting end 74 positioned within about 1-4 mm. beneath the tire surface 76. End 74 may be exposed to the elements but submerged beneath the general tire surface 76. This position is especially advantageous and produces a glowing tire effect when the tire portion 17 is formed of a translucent material or has light-scattering particles incorporated therein. In another variation of the invention, the tire portion may contain a phosphorescent or luminescent material. Not only is there a primary light beam emitted from the light emitting end 74 of the LED but the wheel, as a whole, becomes highly and dramatically visible with a continuous glow as the wheel is spun with the end 74 establishing a vivid circular locus of light about the axis 96.

The LED 18 may be mounted to extend toward either outer face of the wheel 16. For added safety, it is recommended that each skate be fitted with wheels 16 which shine to the left side and wheels which shine to the right side.

Although the in-line skate wheel 16 may be fitted with more than one LED 18, a single LED generally provides sufficient primary light and secondary wheel glowing for visibility by others of the night-time skater. If desired, two lighting systems 14 may be incorporated in a wheel 16, oriented 180 degrees from each other to provide a wheel balancing effect.

The tire is formed of an elastomeric material such as urethane, which cushions and protects the hub and lighting apparatus.

Figure 5:
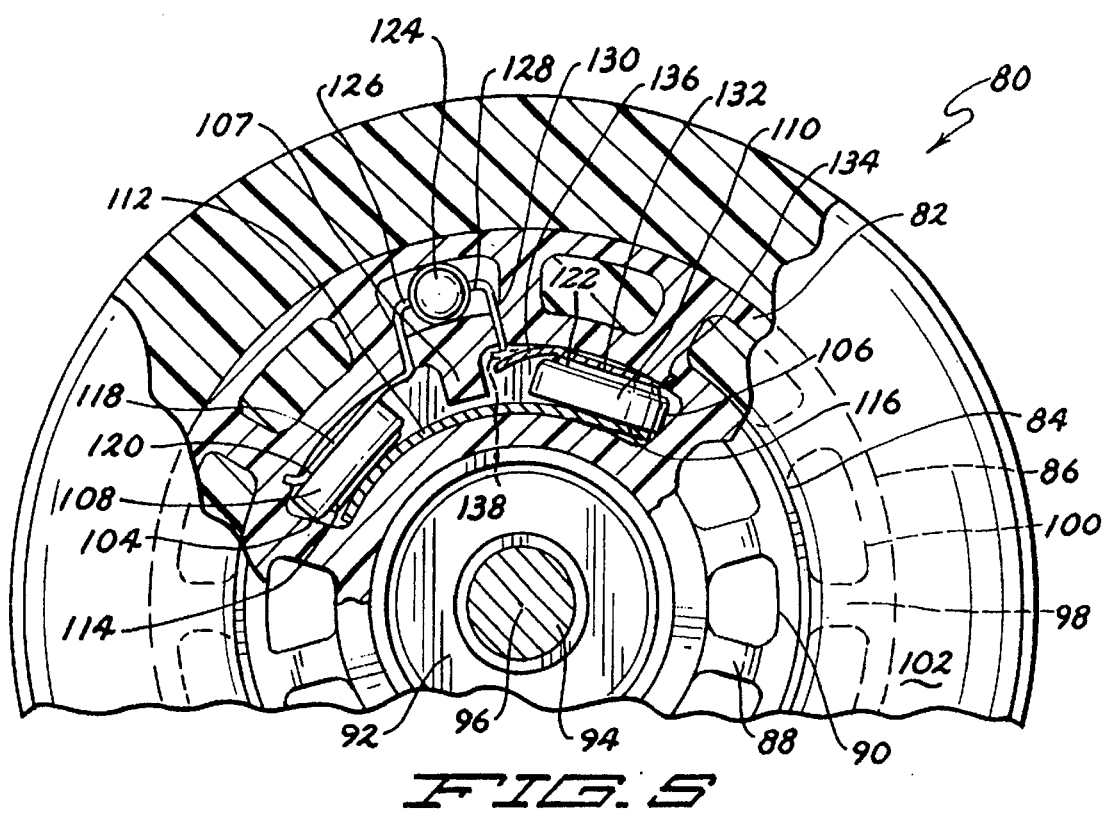
FIG. 5 is a partially cut-away side view of another embodiment of a lighted in-line roller skate wheel of the invention.

FIG. 5 depicts an in-line skating wheel 80 of the type having a hub 82 of greater visible diameter, i.e. typically about 40-43 mm. The hub 82, like the hub 15 of FIG. 4, has an inner ring 84 and an outer annular ring 86. The inner ring 84 is shown with radially oriented spokes 88 separated by apertures 90, for cooling the bearings present in bearing housing 92. The wheel 80 rotates about axis 96 of axle 94, the latter passing through a bearing housing 92 on each side of the wheel. The outer ring 86 includes spokes 98 separating apextures 100 arrayed about the ring. The outer ring 86 is configured to be completely encapsulated in a tire portion 102 which is molded about it. The inner ring 84 contains battery sockets 104, 106 for holding batteries 108, 110, respectively. An insulative battery separation portion 107 prevents the batteries from directly contacting each other. When the wheel rotates, the batteries move along a radius. The batteries are connected in series by first conductive member 112, which is permitted to move outwardly under centrifugal force to compensate for outward movement of battery 110 and maintain contact with both batteries. As shown, the first conductive member 112 connects the positive pole 114 of battery 108 with the negative pole 116 of battery 110. A second conductive member 118 connects the negative pole 120 of battery 108 with one terminal 126 of the light emitting diode (LED) 124. The other terminal 128 of the LED 124 is connected to a first contact member 130 which extends into the socket 106. A reed 132 of spring metal has a first end 134 fixed in the hub 82 and a second end 136 spaced from the first contact member 130. The reed 132 is biased to be in constant contact with the positive pole 122 of battery 110. The dimensions of the reed 132 are predetermined so that when a given centrifugal force is generated by rotation of the wheel 80 about axis 96, the mass of the battery 110 forces the second end 136 of the reed 132 to position 138 against the first contact member 130 to complete the lighting circuit.

In this embodiment, the lighting apparatus aside from the batteries 108, 110, is typically installed in the pre-molded hub 82 and the tire portion 102 of elastic material molded about it, outwardly from the inner ring 84. The batteries 108, 110 may then be installed in the sockets 104, 106 and a cover, not shown, snapped into the hub 82 to cover the battery sockets. Thus, the entire lighting apparatus may be effectively sealed within the envelope of the wheel 80.

The lighting apparatus of the invention provides an unexpectedly high degree of lighting from a very small device, using miniature batteries. The centrifugal switch may be easily adapted to turn on the light at a relatively low rotative speed. The small size and weight of the apparatus make it useful in a small rotating object such as an in-line skate wheel without unduly unbalancing the wheel, and that slight imbalance may be avoided by the addition of a counterbalancing weight.

In some instances, it may be desirable to have a self-contained lighting apparatus module which is insertable as a unit into a cavity in a rotatable device such as the skate wheel 16 or 80 or other device requiring illumination and such module arrangement is within the purview of the invention.

Figure 17:
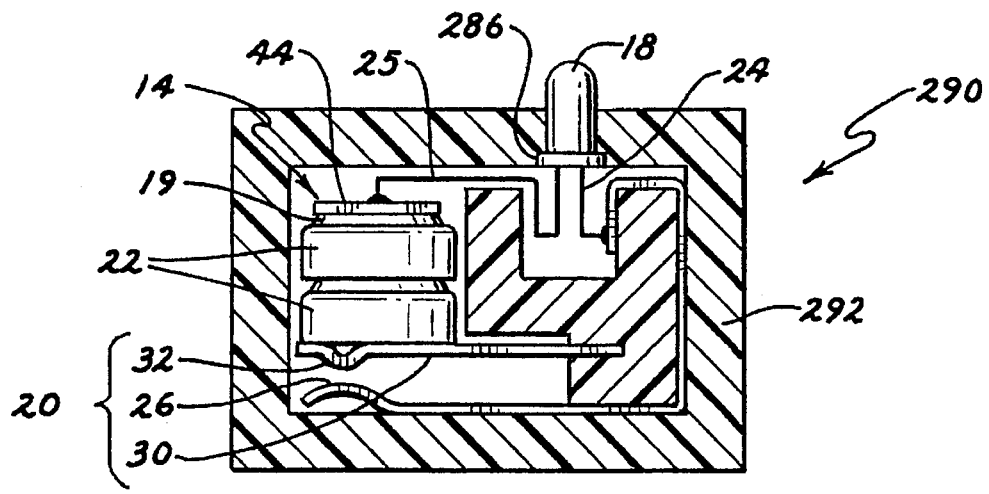
FIG. 17 is a side view of a modular lighting apparatus of the invention.

As shown in FIG. 17, module 290 comprises a case 292 within which a lighting apparatus 14 is encased or encapsulated. The lighting apparatus is as previously described and includes an LED 18 in a socket 286, a dual battery power source 22, a conductive member 44 connecting the battery positive terminal to the LED, a centrifugal switch 20 comprising a first electrical contact member 26, reed 30 and second contact member 32.

Figure 6:
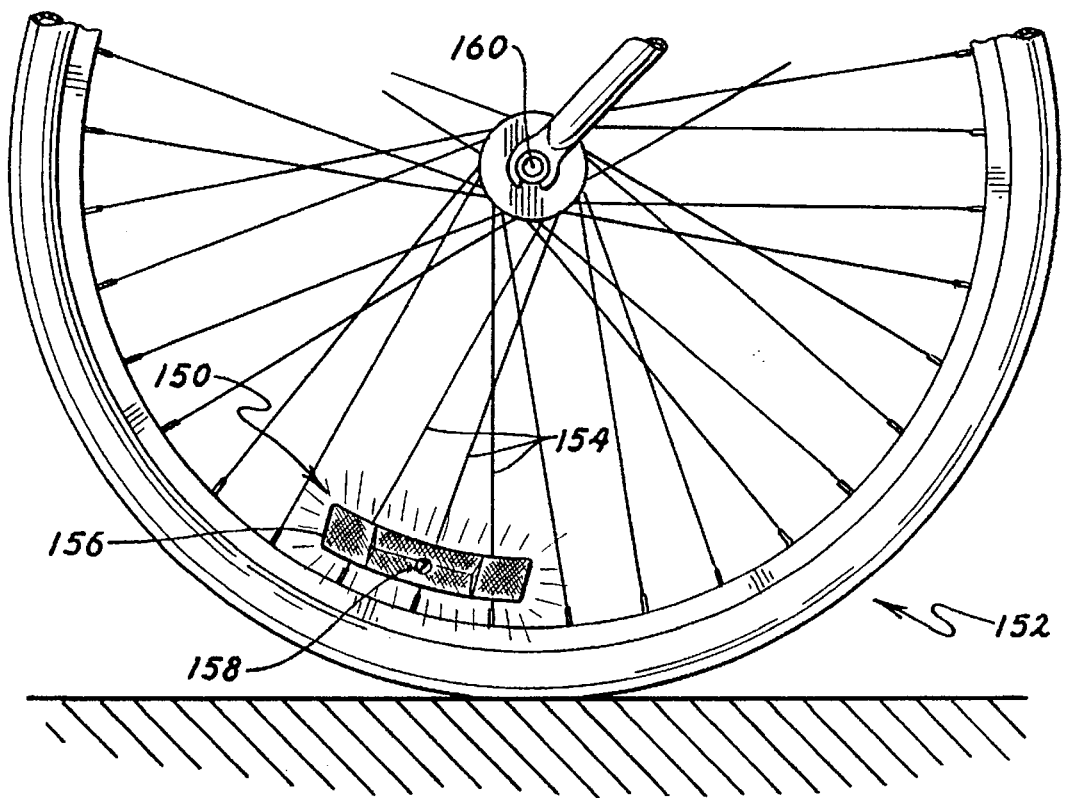
FIG. 6 is a side view of a bicycle reflector light of the invention, as mounted on a bicycle.
Figure 7:
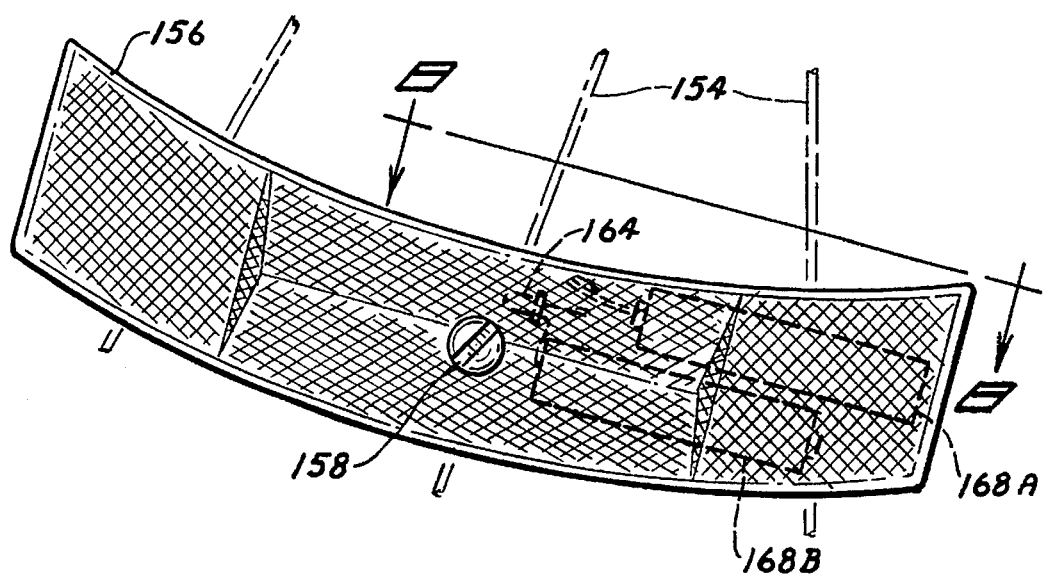
FIG. 7 is an enlarged side view of a bicycle reflector light of the invention.
Figure 10:
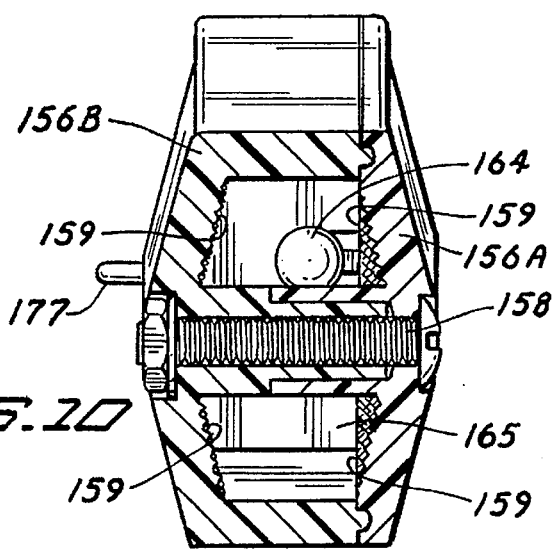
FIG. 10 is a cross-sectional end view of a bicycle reflector light of the invention, as taken along line 10—10 of FIG. 9.

Another use of the centrifugal lighting system of the invention is illustrated in FIGS. 6–10 as a centrifugal reflector light apparatus 150 for a bicycle wheel 152. As shown in FIG. 6, the reflector apparatus 150 utilizes a light emitting diode or LED 164 and may be attached to the spokes 154 of a conventional bicycle wheel 152 by any means known in the art, such as one or more clamps. It may be combined with a reflector to both emit and reflect light. Both embodiments are henceforth identified as "reflector light apparatuses".

The reflector light apparatus 150 is activated to become illuminated in response to rotation of the bicycle wheel 152 about wheel axis 160. In addition, the apparatus may be made to reflect incident light, increasing the range of lighting conditions in which it has high visibility. The apparatus 150 may be configured with a portion which transmits light bidirectionally in both left and right lateral directions from the LED and a portion or portions which reflect incident light in either or both the right and/or left directions.

The internal construction of the reflector light apparatus 150 is depicted in FIGS. 7, 8, 9 and 10. The apparatus 150 includes a case 156 having two sides 156A and 156B which are held together by a central screw 158. Alternatively, other means may be used to join the two sides 156A and 156B. For example, using means known in the art, the two sides may be made to simply snap together. The inner surfaces 159 of the two sides 156A, 156B (see FIGS. 8 and 10) comprise multiple prisms for reflecting external incident light and for transmitting light from an LED 164 within the case 156.

Figure 9:
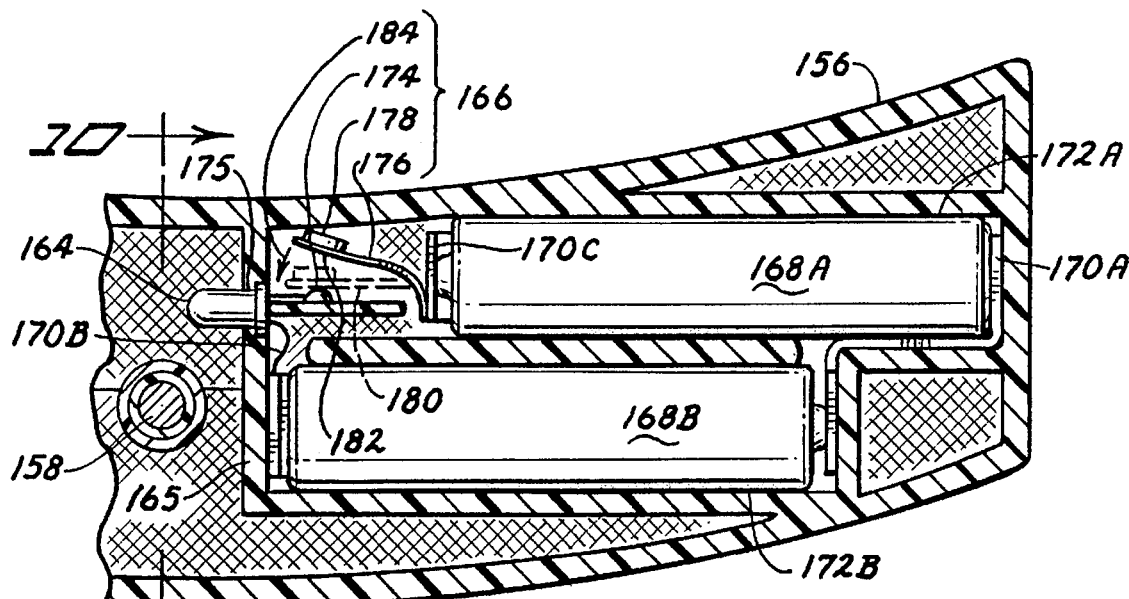
FIG. 9 is a further enlarged partial cross-sectional side view of a bicycle reflector light of the invention, as taken along line 9—9 of FIG. 8.

Enclosed within the case 156 is a lighting system 162 which includes the LED 164 mounted in a socket 175 in internal wall 165, a miniature centrifugal switch 166, batteries 168 (shown here as two 1.5 volt AAA size batteries), and conductors 170A and 170B for connecting the circuit (see FIG. 9). The batteries 168 are shown connected in series relationship in the circuit by conductor 170A, i.e. one pole of battery 168A is connected to the opposite pole of battery 168B. As shown, battery 168B is connected to the LED 164 by conductor 170B, and the batteries 168A, 168B are contained in battery sockets 172A and 172B. A conductor 170C connects battery 168A to a reed 176 of the centrifugal switch 166. When the two halves 156A, 156B of the case are separated, the batteries become accessible for replacement. The centrifugal switch 166 is illustrated as comprising a first contact member 174 connected to the LED 164, a conductive reed 176 connected to the conductive member 170C, and a mass 178 for moving the reed in direction 184 in response to centrifugal force generated during wheel rotation. The elongate reed 176 is moved to position 180 (see FIG. 9) in response to a predetermined centrifugal force whereby a contact portion 182 of the reed is in conductive contact with the first contact member 174 to light the LED. The reed is preferably formed of a thin piece of conductive planar spring metal designed to be deflected to contact the first contact member 174 when a bicycle speed on the order of 2 miles per hour is attained.

The bicycle wheel lighted reflector may also be configured to use smaller batteries such as wafer-shaped hearing aid batteries and the like.

Figure 12:
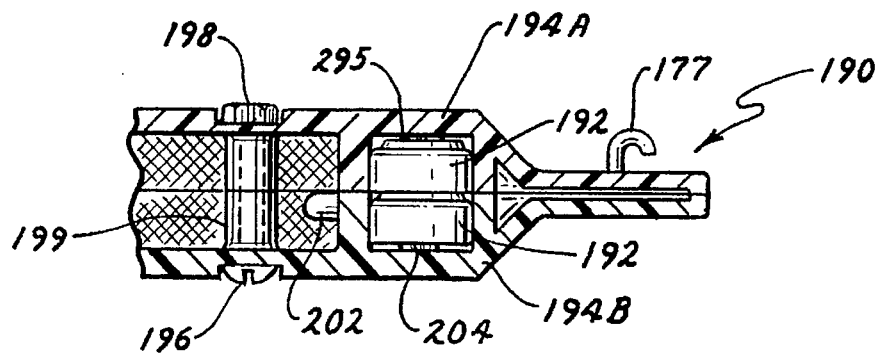
FIG. 12 is a reduced partial cross-sectional top view of a bicycle reflector light of the invention, as taken along line 12—12 of FIG. 11.
Figure 11:
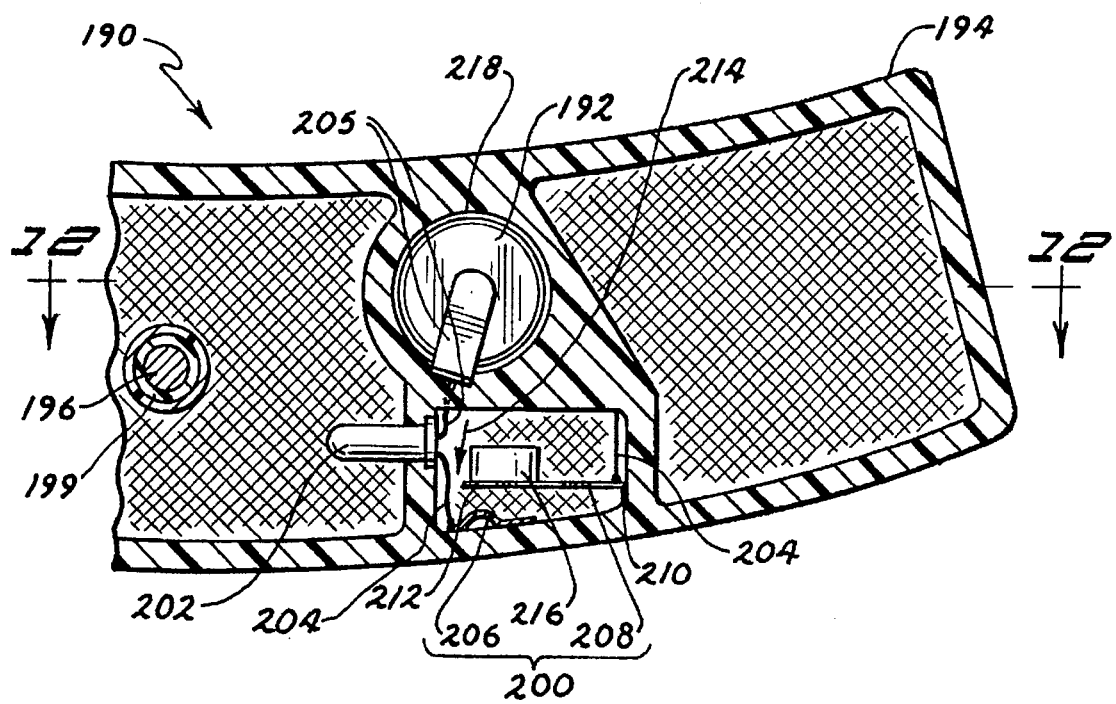
FIG. 11 is an enlarged partial cross-sectional side view of a further embodiment of the bicycle reflector light of the invention.

In FIGS. 11 and 12, a lighted bicycle wheel reflector apparatus 190 powered by hearing aid type batteries 192 is shown with case 194 which is comprised of two case halves 194A and 194B. The case halves 194A and 194B are depicted as being connected by a threaded bolt 196 and threaded nut 198, the bolt passing through a hollow split spindle 199. The complete circuit, including batteries 192, centrifugal switch 200, LED 202 and conductors 204 and 205, is mounted within the case 194. The centrifugal switch 200 comprises a first contact member 206 and a resilient reed 208 having a first fixed end 210 and a second, i.e. contact end 212. The contact end 212 is spaced from the first contact member 206 so that under a given centrifugal force acting on mass 216, the contact end 212 is driven in direction 214 to make electrical contact with the first contact member, thus providing power to the LED 202. The batteries 192 are mounted in series in a socket 218 within the case 194 and connected in the lighting circuit. As long as the centrifugal switch is actuated by rotation of the bicycle wheel, continuous light is provided to the reflector 190. The conductor 205 may be lifted to remove and replace the batteries.

If desired, the entire lighting apparatus, including batteries 192, centrifugal switch 200, LED 202 and conductors 204, 205 may be contained and mounted in a small module which may be fitted into a chamber within the reflector light.

While the drawings show the batteries as comprising two 1.5 volt batteries in series, one or more batteries of the hearing aid type may be used, depending upon the desired voltage. The lighted reflector may be configured so that the battery(ies) may be replaced or recharged when discharged. The very low electrical consumption rate in this apparatus results in a long battery life.

Figure 8:
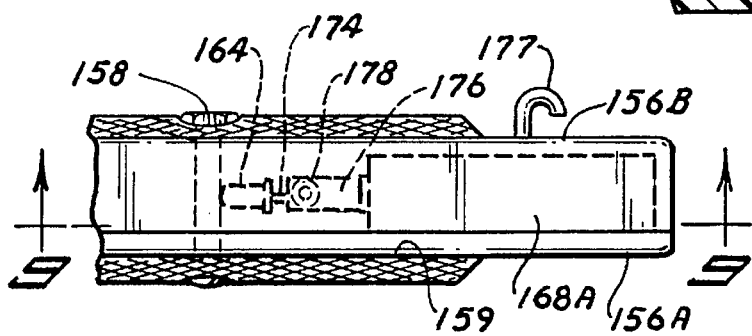
FIG. 8 is a partial cross-sectional top view of a bicycle reflector light of the invention, as taken along line 8—8 of FIG. 7.

Apparatus for attaching the lighted reflector to the spokes of a bicycle wheel may include any conventional fastening device useful in the art. In FIGS. 8 and 12, a spoke retainer 177 is shown attached at each end of the reflector light apparatus for attachment to the wheel spokes.

The lighted reflector greatly increases the visibility of a bike, resulting in enhanced safety to riders of the bicycle in darkness conditions.

In a further application of the centrifugal switch, FIGS. 13, 13a and 14 show a lighting apparatus combined with a recreational rotatable flying disc similar to those commonly sold under the trademark FRISBEE. Such discs have aerodynamic properties such that they may be "thrown" by hand over distances of several hundred feet.

An illuminable rotatable flying disc 220 is shown in the figures as including a lighting apparatus 234 having a centrifugal switch 224 for powering an LED 226 from batteries 238A and 238B. The disc 220 is shown as an aerodynamic lift structure 221 with a generally circular periphery 230 and a central axis of rotation 232. The lift structure 221 may be continuous or have a central opening (not shown) or other off-axis openings about axis 232.

In FIG. 13, a lighting apparatus 234 is shown housed in an integral projection 236 mounted on the inside of the downwardly curved disc periphery 230. A second lighting apparatus 234A is shown as diametrically oppositely positioned on the disc to counterbalance the first lighting apparatus 234. While the lighting apparatus 234 may be made sufficiently light in weight to permit use of a disc 220 with one light, it is preferable to use more than one lighting apparatus in the disc for the sake of a) good balance and b) better visibility under low light conditions. Two or three lighting apparatuses may be symmetrically spaced about the lift structure 221 to maintain the proper aerodynamic balance.

As shown in FIG. 13a, the lighting apparatus 234 housed in projection 236 includes two hearing aid type batteries 238A, 238B connected in series by a first conductor 240 to provide a nominal 3 volts potential. As shown, conductor 240 connects the negative terminal 242 of battery 238A to the positive terminal 244 of battery 238B. A second conductor 252 connects the negative terminal 246 of battery 238B to a lead 254 from the light emitting diode (LED) 226. The other lead 256 from the LED 226 terminates in a first switch contact member 258. Reed 260, preferably formed of thin, flat spring metal, acts as a conductor from the positive terminal 248 of battery 238A, and passes through wall 262 into switch chamber 264, where its free end is a second switch contact member 226. The second contact member 266 may be deflected against the first contact member 258 to close the switch 224, completing the circuit through batteries 238A, 238B, conductors 240, 252, 254, 255, switch 224 and LED 226. A mass 268 provides the desired deflection of reed 260 when the disc 220 is spun at a relatively low speed, energizing the LED 226 to emit light. The mass 268 may be a separate piece of metal for example, held in place behind the reed 260 within the switch chamber 264. Alternatively, the mass 268 may be attached to the reed 260, e.g. by cementation.

The LED 226 is preferably mounted in a socket 270 whereby the distal end 272 of the LED is completely within the disc periphery 230, to avoid damage to the LED. Preferably, however, the socket 270 is open to the exterior.

Figure 14A:
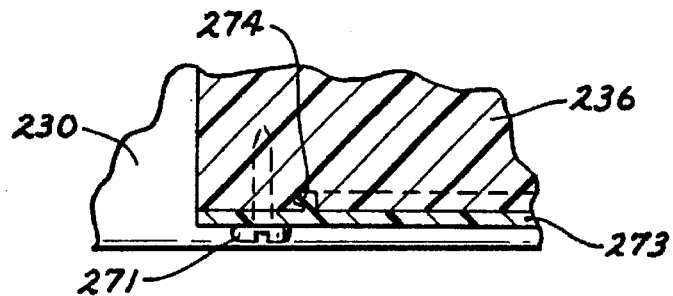
FIG. 14A is an enlarged, partially cut away side view of a lighting apparatus and cover of a lightable rotatable flying disc of the invention.

The lighting apparatus 234 may be completely sealed within the projection 236, or it may be made accessible by removal of a cover 273 as shown in FIGS. 13A, 14 and 14A. This facilitates the replacement of exhausted batteries. The cover 273 is shown as snapping into recess 274 to seal the lighting apparatus 234 against the entrance of water and dirt. Screws or other fasteners 271 may be used to secure the cover 273 over the lighting apparatus 234.

A distinguishing feature of the disc 220 is the means by which the disc 220 continues to glow with illumination following discontinuation of its rotation, i.e. at the end of its flight. In this embodiment, the lift structure 221 is formed of a plastic material containing a phosphorescent material. The use of such materials is known to result in delayed luminescence, thus maintaining a glowing disc 220 for a time period following extinguishment of the LEDs. A variety of commercially available phosphorescent materials may be used to illumine the disc 220 during flight as well as for a post-flight time period during which a user may more easily locate the glowing disc.

Figure 15:
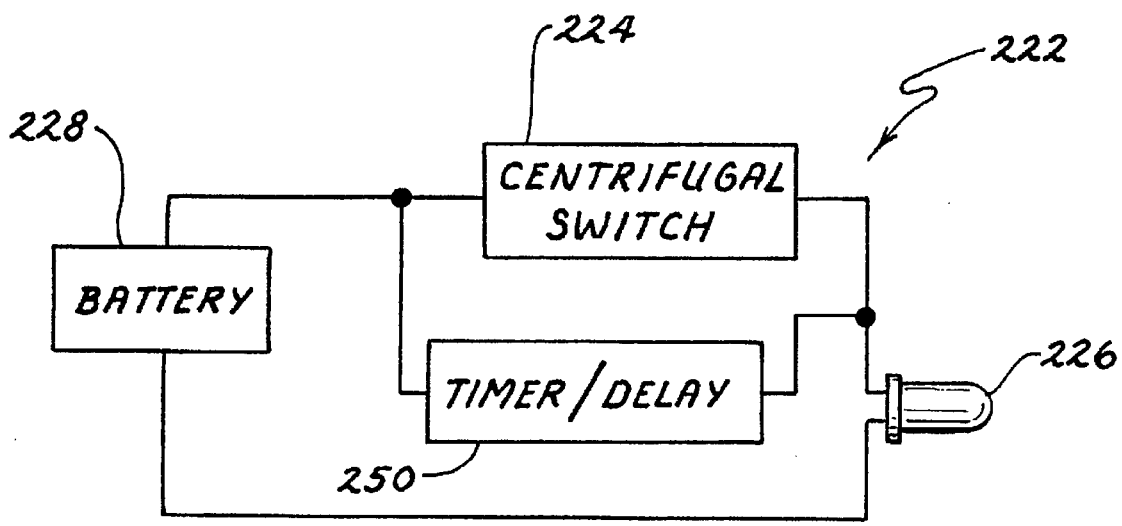
FIG. 15 is a schematic circuit diagram of a lighting apparatus of the invention for a rotatable disc.

An alternative means of producing post-flight illumination is through the use of a timer/delay circuit. As shown in simplified FIG. 15, a timer/delay circuit 250 is shown incorporated into the lighting circuit 222 including battery 228, centrifugal switch 224 and LED 226. Various forms of simple timer/delay circuits 250 exist in the art and may be found useful in delaying light extinguishment. An extended illumination of at least 15 seconds is preferred for finding a landed disc.

Figure 16:
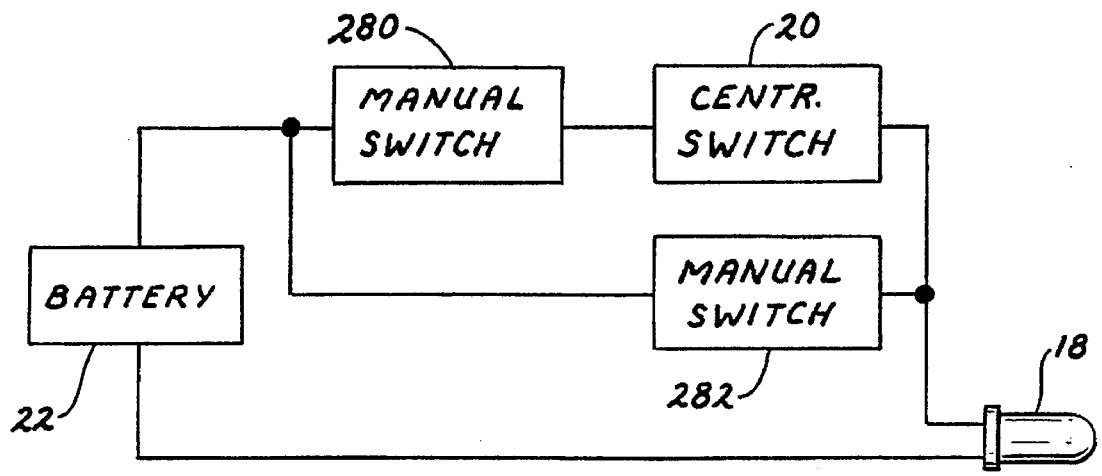
FIG. 16 is a schematic circuit diagram of a lighting apparatus of the invention which incorporates a manual switch or switches into the circuit.

FIG. 16 shows that in any of the depicted embodiments, one or two manual switches may be incorporated into the circuit to increase the usefulness of the lighting apparatus. In FIG. 16, batter 22 powers an LED 18 through a centrifugal switch 20. A first manually activated switch 280 is shown in series with the centrifugal switch 20. The manual switch 280 may, for example, be used to shut off a bicycle light during daytime hours.

Also shown is a second manual switch 282 connected in parallel with the centrifugal switch 20. It may be activated to keep the LED 18 illuminated continuously during darkness, even when e.g. a bicycle is not being ridden. Both switches may be incorporated into a single lighting apparatus, if desired. A single switch may combine both modes.

It is readily evident that the illuminable flying disc of this invention provides light only during flight and for a limited time period, e.g. 10–20 seconds thereafter, greatly prolonging battery life. Post-flight illumination is provided for disc retrieval. Use of a phosphorescent material in the disc causes it to glow in the dark, greatly increasing its visibility during and after flight.

The lighting apparatus is preferably constructed to be very resistant to shock and rough handling typical of play with flying discs.

In any of the applications of the centrifugal switch with an LED illuminator, the entire lighting apparatus may be provided in a modular form. Thus, a bicycle light or flying disc will be configured with a cavity in which the lighting module is readily mounted. The entire lighting apparatus module is replaced as a unit when the batteries have been exhausted.

It is anticipated that various changes and modifications may be made in the construction, arrangement, and operation of the various embodiments of lighting devices and centrifugal switches disclosed herein without departing from the spirit and scope of the invention as defined in the following claims.

What is claimed is:

1. A wheel for an in-line skate to enhance the safety of skating in darkness, said wheel having a central axis of rotation, comprising:

a hub for journalled rotation about an axle and having an inner ring and an outer annular ring;

a plurality of radially oriented spokes connecting said inner ring and said outer annular ring;

a nonconductive elastomeric ground engaging tire molded about said outer annular ring and having two generally parallel lateral sides, said hub and tire having external surfaces comprising an envelope of said skate wheel; and a light module encased off-axis in said tire and said hub, said light module including an electrical circuit comprising a centrifugal switch, a light emitting diode and a battery power source.

2. The in-line skate wheel of claim 1, wherein said light emitting diode is molded into said tire at a radial position outside the inner ring of the hub and having a radiating end exposed to a side of the tire.

3. The in-line skate wheel of claim 1, wherein said centrifugal switch comprises:

a first electrical contact member having a first conductive connection;

an elongate elastic reed having a second electrical contact member thereon and a fixed portion spacedly separated from said second electrical contact member, said reed having a second conductive connection thereon, said first electrical contact member spaced from said second electrical contact member in a first direction; and a mass of dense material configured to force said second electrical contact member into contact with said first electrical contact member upon application of a predetermined centrifugal force in said first direction.

4. The in-line skate wheel of claim 3, wherein said elongate elastic reed comprises a flat spring metal member fixed at one end to the hub.

5. The in-line skate wheel of claim 3, wherein said elongate elastic reed comprises a coil spring fixed at one end to the hub.

6. The in-line skate wheel of claim 3, wherein said mass comprises said battery power source for forcing said second contact member into contact with said first contact member by rotation of said skate wheel.

7. The in-line skate wheel of claim 1, further comprising a socket in said hub for containing said electrical battery.

8. The in-line skate wheel of claim 7, wherein said socket lies between said inner ring and said outer annular ring.

9. The in-line skate wheel of claim 1, wherein said battery comprises two batteries connected in series to provide additive voltage.

10. The in-line skate wheel of claim 9, wherein said additive voltage is approximately six volts.

11. The in-line skate wheel of claim 9, wherein said two batteries are contained in separate sockets lying between said inner ring and said outer annular ring to move along a radius during rotation of the skate wheel.

12. The in-line skate wheel of claim 1, wherein said light module is positioned within the envelope of the skate wheel.

13. The in-line skate wheel of claim 1, wherein said light module is hermetically sealed into said wheel.

14. The in-line skate wheel of claim 1, wherein said hub and said tire have sockets for carrying two light modules, said cavities arrayed in the wheel at 180 degrees from each other whereby said light modules are counterbalanced.

15. The in-line skate wheel of claim 1, wherein said hub and said tire have sockets for carrying a light module and a dummy weight, said sockets arrayed at 180 degrees from each other whereby said light module and dummy weight are approximately equal to be counterbalanced.

16. The in-line skate wheel of claim 1, wherein said tire is formed of a translucent elastomer which transmits light from said light emitting diode through said tire.

17. The in-line skate wheel of claim 12, wherein said light emitting diode is completely enclosed within said tire, said tire formed of a substantially translucent material containing light-scattering particles wherein said tire glows upon activation of said light from said diode.

18. The in-line skate wheel of claim 1, wherein said lighting apparatus is encapsulated within the wheel.

19. The in-line skate wheel of claim 1, wherein said light emitting diode consumes about 2–100 milliamperes of DC current and said battery power source comprises two miniature hearing aid batteries having a nominal life equal to or greater than about 50 hours of providing power to said light emitting diode.

20. The in-line skate wheel of claim 1, wherein said LED is configured to emit light continuously during continuous rotation of said wheel at a predetermined speed for actuation of said centrifugal switch.

21. The in-line skate wheel of claim 12, further comprising a sealable cover for enclosing said battery power source within said hub.

22. The in-line skate wheel of claim 1, wherein said light emitting diode is completely enclosed within said tire, said tire formed of a translucent material containing light-scattering particles wherein said tire glows upon activation of said light from said diode.

23. The in-line skate wheel of claim 1, wherein said tire is formed of a phosphorescent material.

24. The in-line skate wheel of claim 1, further comprising light-scattering particles in said tire.

* * * * *